United States Patent
Todoriki et al.

(10) Patent No.: US 6,864,807 B2
(45) Date of Patent: Mar. 8, 2005

(54) INFORMATION DISPLAY SYSTEM FOR VEHICLE

(75) Inventors: Tsuyoshi Todoriki, Kanagawa (JP); Toshiro Muramatsu, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/189,585

(22) Filed: Jul. 8, 2002

(65) Prior Publication Data

US 2003/0006914 A1 Jan. 9, 2003

(30) Foreign Application Priority Data

Jul. 9, 2001 (JP) .......................... 2001-207923

(51) Int. Cl.[7] .............................................. G08G 1/123
(52) U.S. Cl. ................ 340/988; 340/995; 340/990; 340/994; 340/636.1; 701/22; 701/26; 235/384
(58) Field of Search ........................ 340/988, 995, 340/990, 994, 636.1; 701/22, 26; 235/384

(56) References Cited

U.S. PATENT DOCUMENTS 5,539,399 A * 7/1996 Takahira et al. ............ 340/995
5,815,824 A * 9/1998 Saga et al. .................. 701/22
5,892,346 A * 4/1999 Moroto et al. ............ 318/587
6,181,991 B1 * 1/2001 Kondo et al. ................ 701/22

FOREIGN PATENT DOCUMENTS

| JP | 9-210702 | 8/1997 |
| JP | 10-170293 | 6/1998 |

* cited by examiner

*Primary Examiner*—Thomas J Mullen
*Assistant Examiner*—Tai T. Nguyen
(74) *Attorney, Agent, or Firm*—McDermott Will & Emery LLP

(57) ABSTRACT

In an information display system for a vehicle, an information receiving section receives positional information indicative of a present vehicle position and destination information indicative of a destination of the vehicle to derive a recommended route. A travel distance calculating section calculates a travelable distance on the basis of the obtained information. An editing section sets a travelable area of the vehicle according to the positional information, the travelable distance and guidance information, and edits route information including a recommended route within the travelable area. An outputting section displays the route information.

11 Claims, 7 Drawing Sheets

INFORMATION DISPLAY SYSTEM FOR VEHICLE

BACKGROUND OF THE INVENTION

The present invention relates to an information system which displays information as to a travelable route corresponding to a residual energy state of a vehicle.

Japanese Patent Provisional Publication No. 9-210702 discloses a navigation system which displays energy supply stations on a map when an residual energy quantity of a battery of an electric vehicle becomes smaller than a pre-determined level, so that a user of the electric vehicle can reach a proper energy supply station without causing an accident due to battery exhaustion.

SUMMARY OF THE INVENTION

However, in practical use, users require to further freely enjoy driving with the minimum limitation as to energy supply and to receive useful information as to driving from an information system.

It is an object of the present invention to provide an information display system which properly provides information as to a travelable area upon taking account of an energy state of a vehicle.

An aspect of the present invention resides in an information system for a vehicle. The information system comprising: an information receiving section that receives positional information including a position of the vehicle and destination information including a destination of the vehicle; a storage section that stores guidance information including map information and consumption information as to an energy consumption of the vehicle; a residual quantity detecting section that detects a residual energy quantity of the vehicle; a travel distance calculating section that calculates a travelable distance according to the residual energy quantity and with reference to the guidance information; an editing section that sets a travelable area of the vehicle according to the positional information, the travelable distance and the guidance information, the editing section editing route information as to a recommended route within the travelable area; and an outputting section that displays the route information.

Another aspect of the present invention resides in a method for displaying information to a user of a vehicle. The method comprising: a step of receiving positional information including a position of the vehicle and destination information including a destination of the vehicle; a step of storing guidance information including map information and consumption information as to an energy consumption of the vehicle; a step of detecting a residual energy quantity of the vehicle; a step of calculating a travelable distance according to the residual energy quantity and with reference to the guidance information; a step of setting a travelable area of the vehicle according to the positional information, the travelable distance and the guidance information; a step of editing a recommended route between the present position and the destination within the travelable area; and a step of displaying the recommended route.

The other objects and features of this invention will become understood from the following description with reference to the accompanying drawings.

DETAILED DESCRIPTION OF THE INVENTION

Referring to drawings, there will be discussed first, second and third embodiments according to the present invention. A basic construction of information display system 1 shown in FIG. 1 is commonly employed in first, second and third embodiment according to the present invention.

Information display system 1 according to the present invention sets a travelable area according to a residual energy quantity and displays route information as to a route in a travelable area. Information display system 1 is installed in an electric vehicle and detects a charged state of a battery as a residual energy quantity. Therefore, information display system 1 according to the present invention is explained on a presumption that information display system 1 is equipped in an electric vehicle. However, the invention is not limited to this, and information display system 1 according to the present invention is applicable to various vehicles such as a gasoline-powered vehicle, a diesel-powered vehicle, a natural-gas powered vehicle, a hydrogen-powered vehicle, an alcohol-powered vehicle, and a fuel-cell electric vehicle.

Figure 1:
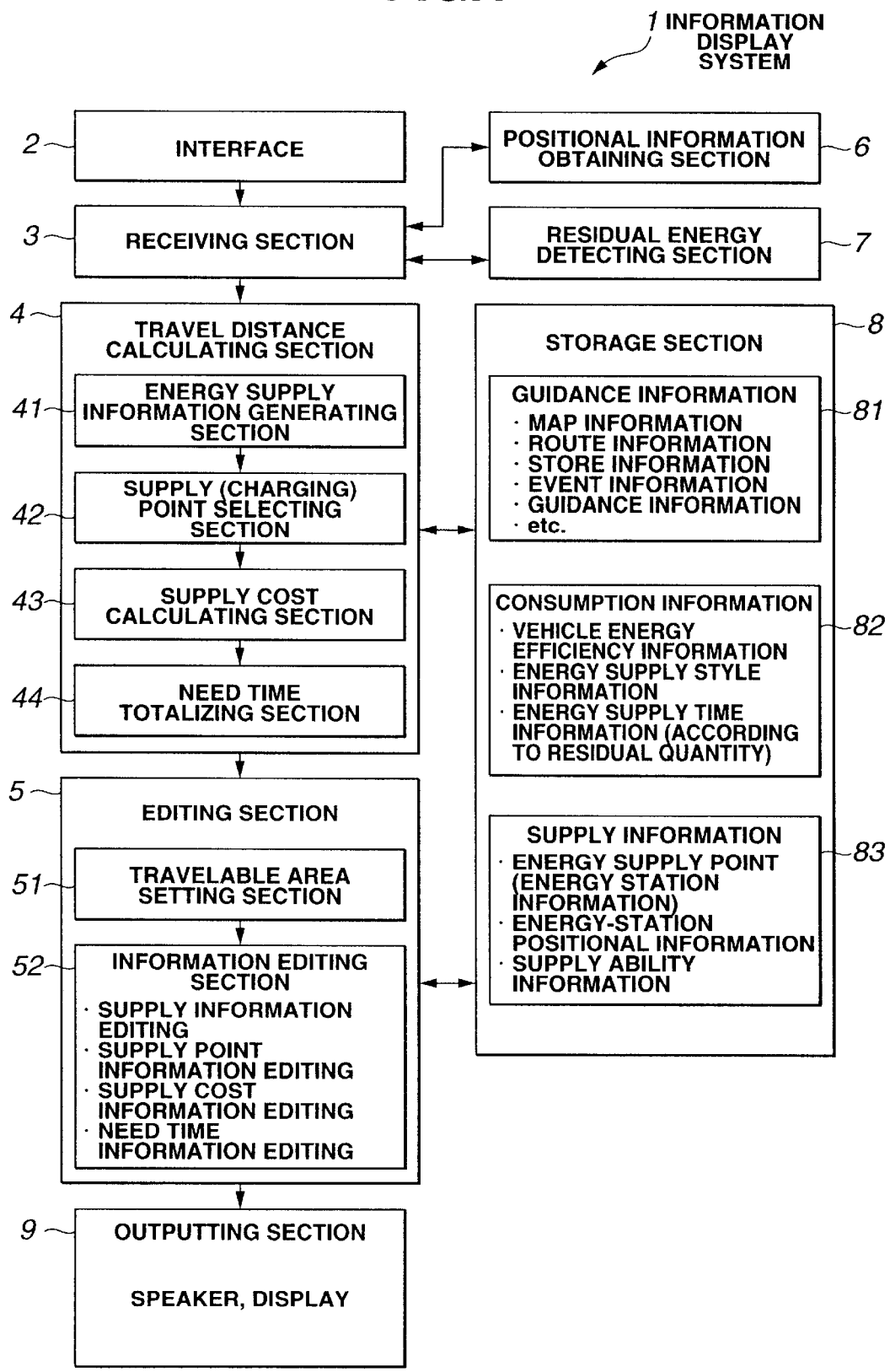
FIG. 1 is a block diagram showing a basic construction of an information display system which is commonly employed in first, second and third embodiment according to the present invention.

Referring to FIG. 1, there will be discussed the construction of information display system 1 common in the first, second and third embodiments according to the present invention. Information display system 1 comprises an interface 2 through which a user inputs information into information display system 1, a positional information obtaining section 6 for obtaining a present position of the vehicle, a residual energy detecting section 7 for detecting a residual quantity of electric power functioning as a drive energy source, a receiving section 3 for receiving various information, a storage section 8 that stores various kinds of information needed for calculating a travel distance and for editing route information, a travel distance calculating section 8 for calculating a travelable distance on the basis of the residual quantity of energy of the vehicle, an editing section 5 for setting a travelable area from the travelable distance and for editing route information from the calculated travel distance, and an outputting section 9 for indicating the edited information to a user.

Subsequently, the above-discussed elements of information display system 1 will be explained in detail, respectively.

Interface 2 is a device for inputting a user's intent such as a system start command, destination information, switching of displayed edit-styles, switching of kinds of information. However, it is not essential that information display system 1 requires the user to input the user's intent by each traveling route. Further, information display system 1 may be arranged to store historical data of the user and to automatically determine a destination on the basis of the stored historical data including a day every week, a time and a destination. For example, if the vehicle is used as a commuter car, it is possible to experientially determine a starting point and a destination point on the basis of a utility pattern of the user. Further, when the user commutes between his/her home to a store for shopping, it is also possible to experientially determine a starting point and a destination point on the basis of the utility pattern of the user. Furthermore, if this round trip is taken as one route, the route is automatically derived without inputting a destination. This arrangement facilitates the user's operation through interface 2.

Receiving section 3 receives information inputted through interface 2. Receiving section 3 receives a lot of information and outputs the information to travel distance calculating section 4. Further, receiving section 3 receives positional information indicative of a present position of the vehicle from positional information obtaining section 6 and information as to an energy charged condition of a battery from residual quantity detecting section 7. Positional information obtaining section 6 has a function of detecting a present position of the vehicle in driving. Positional information obtaining section 6 obtains the present position of the vehicle by utilizing information of GPS (Global Positioning System), information outputted from a geomagnetic sensor and information of a steering angle of the vehicle, which are utilized, for example, in an automatic cruising system. The GPS is installed in the vehicle and calculates the present position on the basis of radio waves received from position-measurement satellites.

Further, residual quantity detecting section 7 detects the residual energy quantity of the battery by obtaining information from an energy quantity sensor connected to an energy quantity indicating meter in the vehicle.

Travel distance calculating section 4 receives a lot of information through receiving section 3. Travel distance calculating section 4 calculates a travelable distance with reference to the information inputted through receiving section 3 and the other information stored in storage section 8. Storage section 8 may be installed in information display system 1, or may employ a part of a storage device of a car navigation system or a readable medium such as CD (Compact Disc), MD (Mini Disc), MO (Magneto-Optical Disc) and DVD (Digital Versatile Disc).

Next, there will be explained information stored in storage section 8.

Storage section 8 stores guidance information 81 including map information, consumption information 82 including vehicle energy efficiency, and supply information 83 including reference information referring positions of supply stations. More specifically, guidance information 81 includes at least map information, and further includes route information corresponding to positions on the map information such as check-point information, distance information and route-guidance information, shop information, guidance information such as advertising information. That is, guidance information 81 includes available information for a user during a driving. It will be understood that it is not necessary to store all of guidance information 81. A part of guidance information 81 may be stored in storage section 8 and may be utilized independently or may be utilized in combination with other information. Consumption information 82 includes energy efficiency information such as energy consumption information of the vehicle, a type of fuel supply method as to whether gasoline or electric energy is supplied and a time period needed for supplying energy. The energy efficiency information includes a value obtained by a definition [travel distance/gasoline volume (M/L)] in case of a gasoline-powered vehicle, and a value obtained by a definition [travel distance/charging rate] in case of electric vehicle. Supply need-time, which is a time period needed for executing the energy supply operation, generally increases according to the increase of the charged level since the internal resistance of the battery increases according to the increase of the charged level. Therefore, a charging speed (charge quantity/time) decreases according to the increase of the charged level. More specifically, the time needed for charging the battery to 60% is short, and the time needed for charging the battery to 100% (fully charged condition) is very large. Therefore, a time period for charging from 10% to 50% is apparently different from a time period for charging from 60% to 100%. Accordingly, it is necessary to calculate the charging time by each situation. Storage section 8 is arranged to determine the need time needed for charging electric energy according to the charged level of the battery, and has stored a table indicative of a relationship between the charge time and a combination of a charge start level and a charge end level, so that information display system 1 is capable of calculating a correct need time needed for the energy charging according to a practical condition of the battery from the information of storage section 8. It is preferable to determine this charging need time by each vehicle since the need time varies according to a type of a vehicle and a size of an engine.

Travel distance calculating section 4 calculates the travelable distance on the basis of this stored information and the information inputted from the user and the vehicle. Travel distance calculating section 4 comprises an energy supply information generating section 41 which determines whether or not it is necessary to execute the energy supply, a supply point selecting section 42 which selects a supply point wherein the energy supply is executed if it is necessary to execute the energy supply, a supply cost calculating section 43 which calculates a cost needed for executing the energy supply, and a need time totalizing section 44 which totalizes a time period from a moment at the present position to a moment at the destination. By operating travel distance calculating section 4, energy supply necessity determining information, selected supply-point information, supply cost information and need-time information are obtained.

Editing section 5 edits the information obtained at travel distance calculating section 4. Editing section 5 comprises a travelable area setting section 51 which sets a travelable area of the vehicle in response to the user's command inputted through interface 2, and an information editing section 52 which edits route information on the basis of the information obtained by travel distance calculating section 4. Information editing section 52 is capable of editing information needed by the user. Accordingly, information editing section 52 edits the route information by extracting a part or all of information calculated by travel distance calculating section 4 in response to the user's demand. The route information edited by editing section 5 is sent to outputting section 9, and outputting section 9 displays the route information to the user.

Subsequently, there will be discussed the basic operation of this information display system 1 according to the present invention.

The route and the travel distance of the route are derived from the destination information inputted through interface 2 by the user and the positional information obtained from positional information obtaining section 6.

Travel distance calculating section 4 commands residual quantity detecting section 7 to detect the present residual energy quantity such as the charged condition of the battery. Further, travel distance calculating section 4 calculates the travelable distance on the basis of this information and the vehicle energy efficiency information in consumption information 82 of storage section 8. More specifically, travel distance calculating section 4 calculates the travelable distance by multiplying the residual energy quantity (charge quantity) and the energy efficiency (travelable distance/charge quantity).

By comparing the calculated travelable distance and the route distance between the present position and the destination, it becomes possible to determine whether or not the vehicle of the present energy condition can reach the destination. Energy supply information generating section 41 generates the determination result of travel distance calculating section 4. When it is determined that the vehicle cannot reach the destination, it is necessary to execute an energy supply. Therefore, supply point selecting section 42 selects a suitable supply point for executing the energy supply. This selecting operation is executed from the viewpoints that the host-vehicle can reach the selected supply point only by the present residual energy and that the selected supply point does not largely deviate from the route between the present position and the destination. Further, it is convenient to take account of the consumption const at the selected supply point, in order to determine whether it is available for the user to select the supply point.

Supply cost calculating section 43 calculates a cost needed for supplying the energy necessary for traveling a difference between the travel distance and the route distance. This cost includes a time cost in addition to a fee cost.

Running out (Exhaustion) of energy is an unexpected accident for the user, and it is important for the user to reach the destination by an appointment time or a booked time. Therefore, information display system 1 according to the present invention is arranged to display a total need time needed in a case that the vehicle executes the energy charge by a predetermined quantity at an energy supply point and reaches the destination.

Need time totalizing section 44 calculates the total need time needed by this traveling. More specifically, need time totalizing section 44 first derives the route between the present position and the destination. Next, need time totalizing section 44 calculates a first need time needed for traveling from the present position on the route to the energy supply point while taking account of average vehicle speed, a second need time for executing the energy supply, and a third need time needed for traveling from the supply point to the destination on the route. Further, need time totalizing section 44 obtains a total needed time by totalizing the first, second and third need times. By this operation of need time totalizing section 44, it becomes possible to estimate the total need time needed for traveling from the present position through the energy supply to the destination, and therefore it is possible to quickly response to the eventuality including the running out of energy.

Subsequently, editing section 5 sets the travelable area according to the positional information, the destination information, and the travelable distance. The travelable area is information from which the user takes account of the travelable area of the vehicle within the residual energy (without executing the energy charge). In setting the travelable area, the route from the present position to the destination may be treated as a reference route (line), or the point of the present position of the vehicle may be treated as a reference point. Further, the travelable area may be set at a right hand side of the route so as to take account of the area as a destination relative to the route or may be set at a left hand side of the route similarly. Further, the travelable area may be set as a circle or oval around a center of the present position so as to take account of a spread relative to the present position, or may be set as a sector shaped area relative to a center of the present position.

One of these travelable areas may be previously selected and may be displayed at outputting section including a display (monitor) to the user, or the user may select a preferable one of these travelable areas. Further, various areas may be displayed to the user, and the user may select one of the various areas. That is, editing section 5 of information display system 1 according to the present invention may freely set the travelable area without being limited by the above-discussed disclosure.

The information obtained by travel distance calculating section 4 is displayed independently or corresponding to the set travelable area. In a view of supplying a lot of information to the user, the information may be compositely provided to the user, or each of the travelable area information, the supply necessity information, the supply point information, the supply cost information, and the needed time information may be displayed independently or in combination.

First, second and third embodiments are concretely explained hereinafter. Information display systems 1 of the first, second and third embodiments are arranged to utilize a hardware of a car navigation system installed in the vehicle. More specifically, an input device of the navigation system is utilized as interface 2 and receiving section 3 of information display system 1 of the first, second and third embodiments. A part of a calculating device of the navigation system is utilized as travel distance calculating section 4 and editing section 5. A display, a monitor and a speaker unit of the navigation system are utilized as outputting section 9. A medium reading device of the navigation system and a medium such as CD are utilized as storage section 8.

Figure 2:
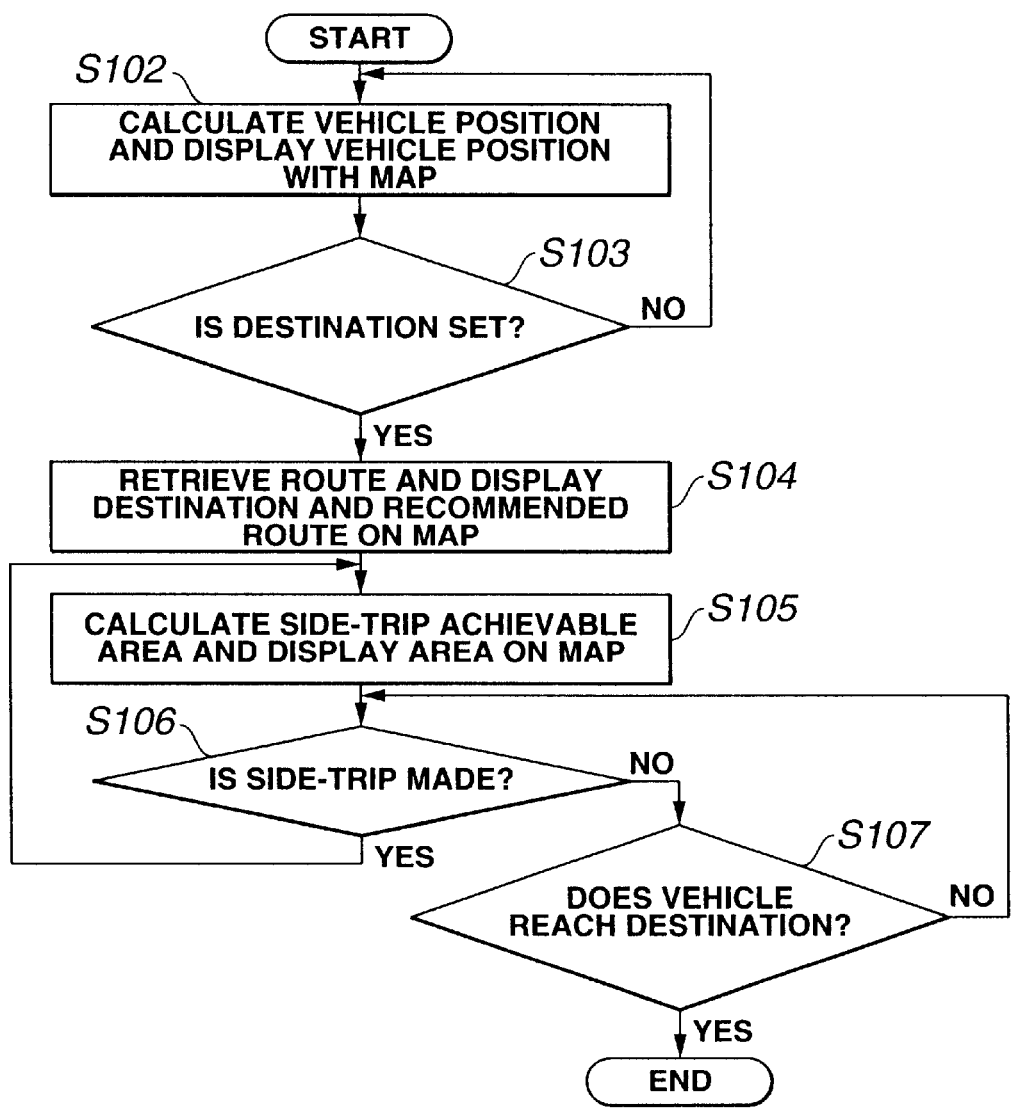
FIG. 2 is a flowchart showing an operation of the first embodiment.
Figure 3:
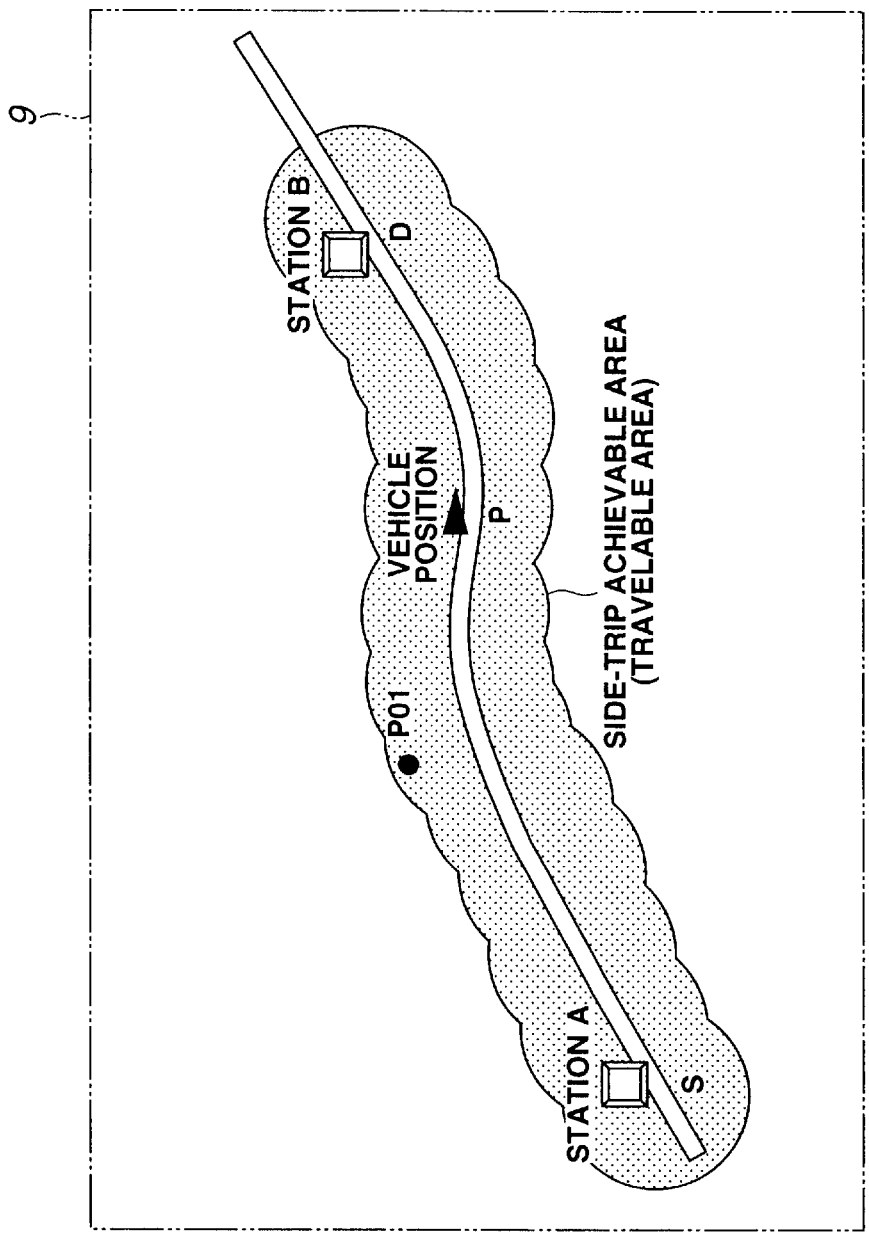
FIG. 3 is a view showing a displayed content as a result of the operation of the first embodiment.

With reference to FIGS. 2 and 3, the first embodiment of information display system 1 according to the present invention will be discussed.

FIG. 2 is a flowchart showing an operation of information display system 1 of the first embodiment. FIG. 3 is the route information displayed as a result of the operation shown by the flowchart of FIG. 2.

Information display system 1 of the first embodiment according to the present invention utilizes a GPS receiver function of the navigation system as positional information obtaining section 6. Accordingly, positional information obtaining section 6 receives the radio waves for establishing the present position of the vehicle from the satellites, and sends the present-position indicative signal through receiving section 3 to travel distance calculating section 4.

CD-ROM functioning as storage section 8 has previously stored the guidance information 81 which includes the map (road map) information, destination distinguishing information, and information as to shops and facilities, the consumption information 82 which includes the energy efficiency of the vehicle, and the supply information 83 which includes the positions of supply stations.

Interface 2 is a device through which the user sets the destination and switches the displayed contents. The set contents are sent to travel distance calculating section 4 through receiving section 3. Travel distance calculating section 4 calculates the present position of the vehicle and a recommended route between the present position and the destination. Further, travel distance calculating section 4 reads the guidance information in CD-ROM functioning as storage section 8, by having access to CD-ROM on the basis of the calculated result, and displays the route information regarding the recommended route on a monitor functioning as outputting section 9.

Residual quantity detecting section 7 determines the residual energy quantity of the charge in the battery and calculates the travelable distance on the basis of the battery residual quantity. Further, residual quantity detecting section 7 outputs the calculated travelable distance to editing section 5.

Editing section 5 calculates the travelable area wherein the vehicle can make a side-trip without supplying (charging) the energy. Editing section 5 outputs the information indicative of the travelable area to outputting section 9. A monitor functioning as outputting section 9 displays the travelable area on the map showing the area around the present position of the vehicle.

With reference to the flowchart of FIG. 2 and the displayed content shown in FIG. 3, the operation of information display system 1 of the first embodiment is further specifically discussed.

The flowchart of FIG. 2 starts in reply to the start command of the user through interface 2.

At step S102, a receiver of GPS functioning as positional information obtaining section 6 receives radio waves from GPS satellites and outputs the signal for establishing the present position of the vehicle to the calculating section of the navigation system. Therefore, information display system 1 calculates a start vehicle position S indicative of a start position of the vehicle at a moment that the user starts information display system 1 through interface 2. Start vehicle position S is displayed together with the map information indicating an area around start vehicle position S on the monitor functioning as outputting section 9. CD-ROM functioning as storage section 8 has previously stored the map information including road information, and positional data including various POI (Point of Interest). Travel distance calculating section 4 continuously detects the present position of the vehicle on the basis of the signal from a GPS system functioning as positional information obtaining section 6.

At step S103, information display system 1 determines whether the user inputs a destination D or not. In other words, information display system awaits that the user inputs a destination D through interface 2. When the determination at step S103 is affirmative, that is, when the user inputs the destination through interface 2 into information display system 1, the routine proceeds to step S104. When the determination at step 103 is negative, the routine returns to step S102. That is, until the user inputs the information indicative of the destination, steps S102 and S103 are repeated.

At step S104, travel distance calculating section 4 of information display system 1 retrieves a recommended route from the guidance information 81 stored in CD-ROM, on the basis of the vehicle start position S and the destination D. Further, information display system 1 displays the vehicle start position S, the destination D and the recommended route on the map indicative of the area around the present vehicle position. Herein, the present position of the vehicle momentarily changes according to the time elapse, and therefore, the position of the vehicle at a system start moment is denoted by S, and a present position of the vehicle is denoted by P, as shown in FIG. 3.

At step S105, information display system 1 calculates a side-trip achievable area and displays the side-trip achievable area on the map.

More specifically, residual quantity detecting section 7 detects the charged state of the battery and outputs the detected residual quantity of the battery to travel distance calculating section 4. Travel distance calculating section 4 calculates the travelable distance according to the residual energy quantity of the battery. In the first embodiment, storage section 8 has previously stored the travelable distance relative to the charge level of the battery, and therefore travel distance calculating section calculates the travelable distance with reference to this relationship stored in storage section 8. Further, since the travelable distance varies according to the weather condition and a total weight of the vehicle with passengers, the travelable distance per a predetermined charge quantity may be determined by recording the recent travel history in storage section 8 and by using the recorded this result. That is, the travelable distance is calculated during the traveling as the need arises, and the newest calculated result is sent to editing section 5. Travelable area setting section 51 of editing section 5 sets the side-trip achievable area wherein no energy charge is executed during the traveling to the destination, on the basis of the distance of the recommended route and the travelable distance. More specifically, travelable distance setting section 51 calculates the reachable area along the recommended route on the basis of the distance obtained, by dividing the difference between the travelable distance and the distance of the recommended route by 2, and with reference to the map information stored in CD-ROM. Further, travelable area setting section 51 sets the travelable area along the recommended route from the calculated result. Information editing section 52 receives the information as to the travelable area and edits the travelable area as route information. Further, information editing section 52 outputs the edited information to monitor 9 so as to display the side-trip achievable area to the user.

At step S106, it is determined whether or not a side-trip is (was) done. When the determination at step S106 is affirmative, that is, when a side-trip is done, it is necessary to change the recommended route toward the destination upon taking account of the content of the side-trip. In other words, information display system 1 always monitors whether the vehicle is traveling along the recommended route or deviates the recommended route. When the side-trip is done, the routine returns to step S105 so that the travelable area is updated according to the traveled route including the side-trip and the updated travelable area is displayed on the map. When the determination at step S106 is negative, the routine proceeds to step S107.

At step S107, information display system 1 determines whether the vehicle reaches the destination D or not. Accordingly, until the vehicle reaches the destination, this update of the recommended route is repeatedly executed. When the vehicle reaches the destination D, the present routine of FIG. 2 is terminated.

This travelable area is displayed on the map by a color different from those of the map and other information, so that the user can easily distinguish the travelable are from the map and others.

With the thus arranged information display system 1 of the first embodiment, when the electric vehicle moves to the destination D on the presumption that the vehicle reaches the destination D without executing the charging of the battery, the side-trip achievable area is displayed on the map displayed in monitor 9. Therefore, the user easily determines whether the vehicle can have a side-trip without executing the energy charge, that is, whether the vehicle can reach the destination without executing the energy charge even if the side-trip is made. This enables the user to easily drive the vehicle without being anxious to the energy condition.

Figure 4:
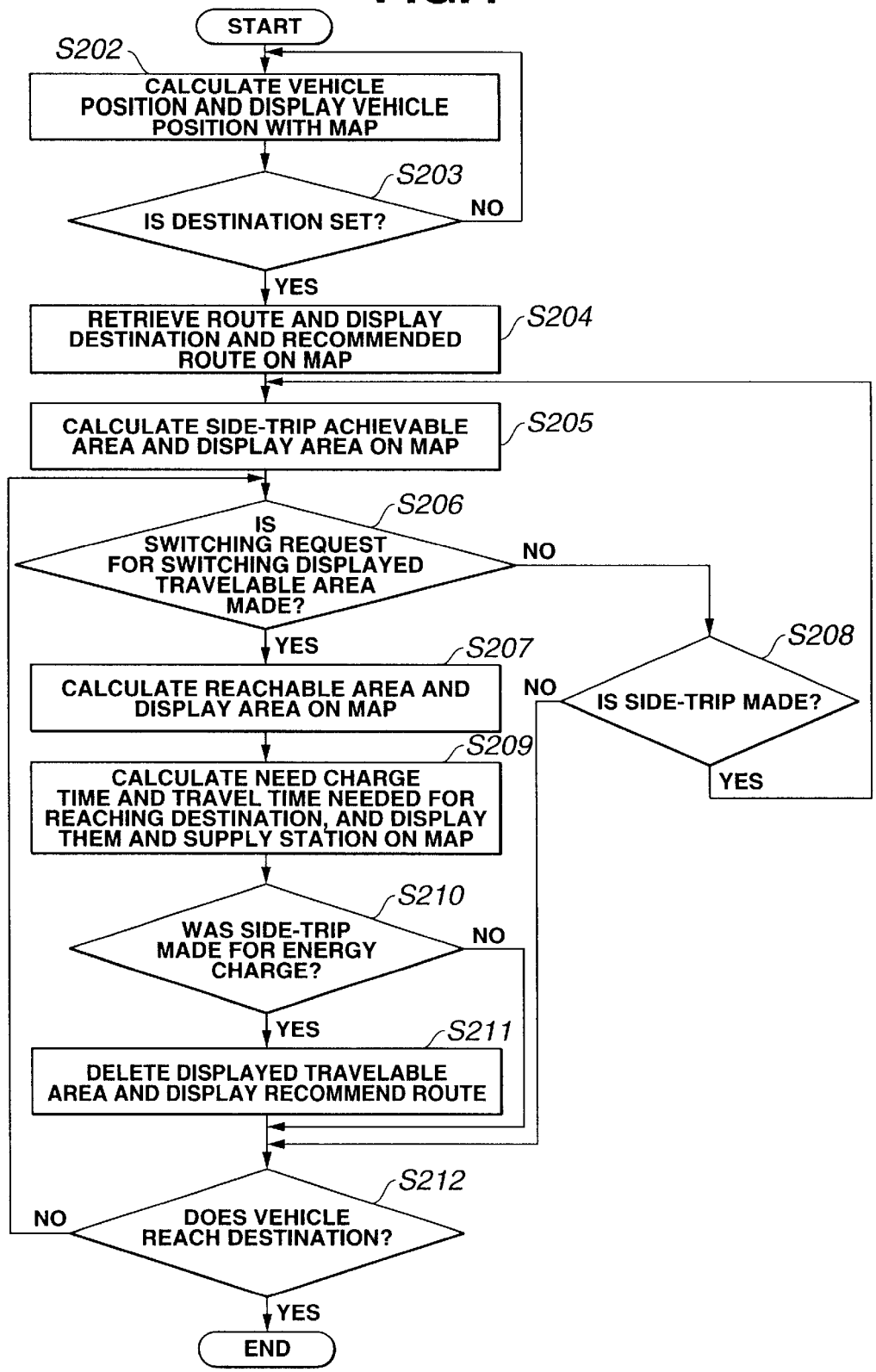
FIG. 4 is a flowchart showing an operation of the second embodiment.
Figure 5:
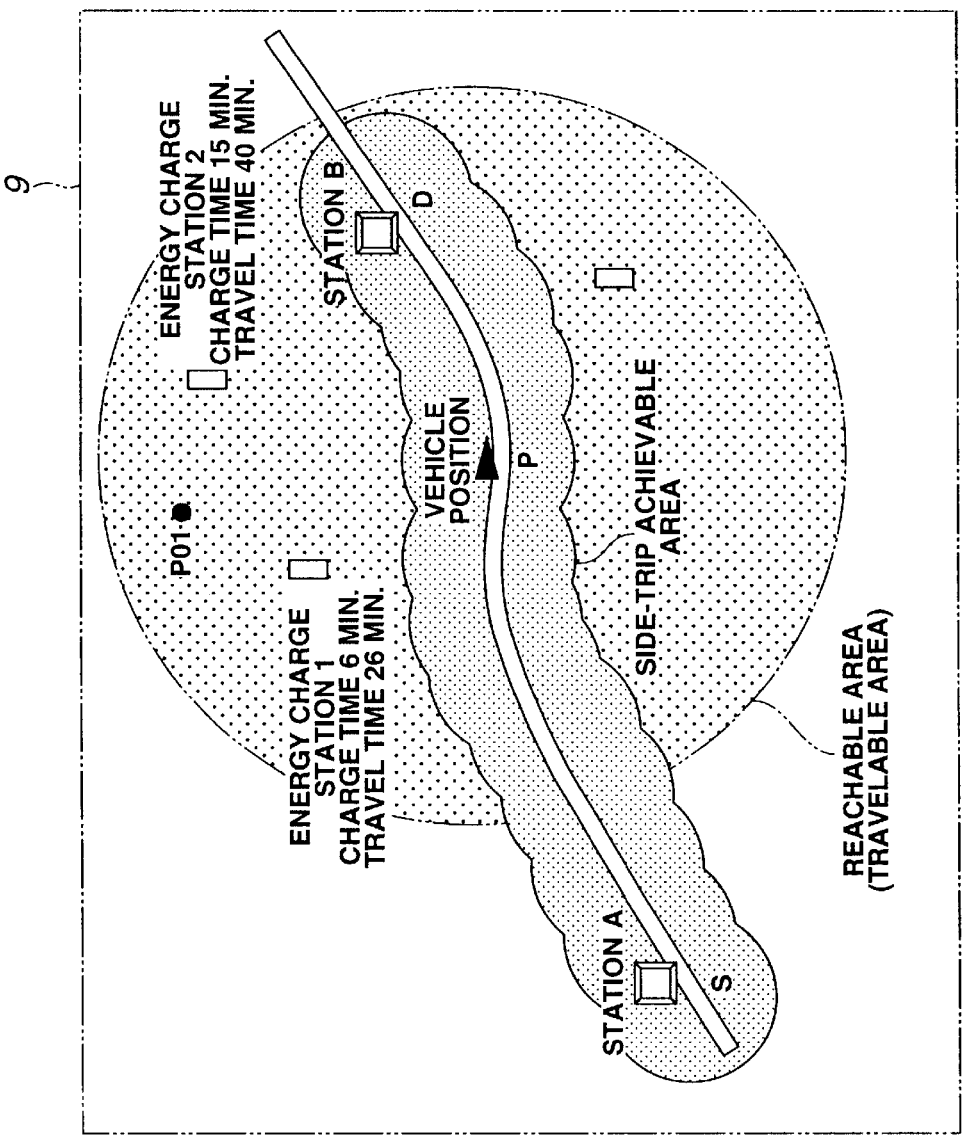
FIG. 5 is a view showing a displayed content as a result of the operation of the second embodiment.

Referring to FIGS. 4 and 5, there is shown the second embodiment of information display system 1 according to the present invention.

FIG. 4 is a flowchart showing an operation of information display system 1 of the second embodiment. FIG. 5 is the route information displayed as a result of the operation shown by the flowchart of FIG. 4.

The second embodiment is arranged to prepare different display contents as to the travelable area and to have a display content selecting function which executes the display of the travelable area, the switching of the displayed contents and the finishing of the display. This displayed content selecting function is a part of the input control device of interface 2.

Herein, the route information includes the information of the route within the travelable area.

In this second embodiment, there are shown a first side-trip achievable area which spreads along the route from the start position S to the destination and a second reachable area which spreads around a point of the present position P of the vehicle. Since the travelable area is an area wherein the vehicle can travel without the energy charge and is not limited into a specific setting.

Since there are a plurality of display contents of the route information, the user commands information display system 1 to display the route information, to switch the contents and to stop the display. However, this command is not an essential matter. For example, in response to detecting event information that there is a famous POI within a predetermined area around the vehicle, the display of the route information may be executed. Further, when the residual quantity of the energy in the battery becomes smaller than a predetermined quantity, the operation for displaying the route information may be executed. With this arrangement, even if the user (driver) does not determine or request the display of the route information upon finding POI, information display system 1 can automatically display the travelable area. This enables the user (driver) to easily drive the vehicle. Further, the finish of the display may be automatically executed at a predetermined time later if the vehicle travels the recommended route. With this arrangement, the user may recognize the travelable area only when it is necessary.

The basic construction of the second embodiment is practically the same as that of the first embodiment. The operation shown by steps S201 through S205 of the second embodiment is similar to the operation shown by steps S101 through S105. Therefore, the explanation thereof is omitted herein.

The explanation of the operation of the second embodiment executed from step S205.

At step S205, the side-trip achievable area is set as is similar to that of the first embodiment.

At step S206, it is determined whether or not the switching request for switching the displayed travelable area. When the determination at step S206 is affirmative, that is, when the display request is generated, the request is inputted to travel distance calculating section 4 and editing section 5.

At step S207, information display system 1 calculates the reachable area and display the area on the map. That is, in reply to this request, residual quantity detecting section 7 detects the charged state of the battery and outputs the detected result to travel distance calculating section 4, as is similar to the case of setting the side-trip achievable area. Travel distance calculating section 4 calculates the travelable distance on the basis of the residual quantity of the battery and outputs the calculated travelable distance to editing section 5. More specifically, the calculation of the travelable distance is executed as follows:

(1) The side-trip achievable area is calculated by subtracting a distance of the recommended route to the destination from the travelable distance, by dividing the obtained difference by 2, and by determining the side-trip achievable area with reference to the map information of CD-ROM functioning as storage section 8 and the calculated quotient;

(2) The reachable area is calculated as a travelable-distance-diameter circle round the present position with reference to the map information of CD-ROM, or travel distance calculating section 4 retrieves a route by way of a place from the present position to the destination, except for the recommended route.

(3) Travelable area setting section 51 of editing section 5 calculates a reachable area A or reachable area B from the present position P, on the condition that the vehicle can reach the destination without the energy charge by way of the route, and outputs the calculated reachable area A or B to the monitor of outputting section 9.

(4) Further, monitor 9 displays the side-trip achievable area along the recommended route and the circular reachable area round the present position P, as shown in FIG. 5.

The displayed content on monitor 9 is arranged so that the user can easily distinguish between the side-trip achievable area and the reachable area A. For example, these areas and the background (the map) are drawn by different colors, respectively.

On the other hand, when the determination at step S206 is negative, that is, when the user does not request to switch the displayed style (content) of the travelable area, the routine proceeds to step S208 wherein it is monitored whether a side-trip is made or not. Until the vehicle reaches the destination, this calculation of the side-trip reachable area is executed.

Travel distance calculating section 4 comprises energy supply information generating section 41 for determining the need of the energy supply, supply point selecting section 42 and supply cost calculating section 43. Energy supply information generating section 41 determines whether or not it is necessary to execute the energy charge on the basis of the travelable distance and the distance of the route to the destination.

Supply point selecting section 42 reads the position data as to charge stations stored in CD-ROM as the supply information, and selects a preferred supply station within the travelable area.

Supply cost calculating section 43 reads the supply ability and the like of the selected supply station in the supply information from CD-ROM, and calculates the charge quantity needed for reaching the selected supply station and the time cost (charge cost) needed for achieving the energy charge at the selected supply station.

At step S209, need time totalizing section 44 calculates the need time needed for moving the vehicle from the selected charge station and the destination based on the average vehicle speed throughout the route. Information editing section 52 of editing section 5 receives the totalized time of the moving time between the present position and the selected supply station, the charging time and the moving time from the supply station to the destination, from need time totalizing section 44. As shown in FIG. 5, icons indicative of positions of selected supply stations and other information and the travelable area are displayed on the map.

At step S210, it is determined whether or not a side-trip was made. When the determination at step S210 is affirmative, that is, when the vehicle reaches the supply station after having a side-trip through a route except for the recommended route, the routine proceeds to step S211. When the determination at step S210 is negative, the routine jumps to step S212.

At step S211, information display system 1 deletes the travelable area and displays the recommended route from the supply station to the destination on the monitor.

At step S212 subsequent to the negative determination at step S210 or the execution at step S211, it is determined whether or not the vehicle reaches the destination. When the determination at step S212 is negative, the routine returns to step S206. That is, until the vehicle reaches the destination, the display style switching and the selected style displaying operations are repeated.

With the thus arranged second embodiment according to the present invention, when the electric vehicle moves to the destination, and when the user desires to drive the vehicle over the travelable area without executing the energy charge by way of the area-over trip, the displayed information clearly shows the travelable area and the position of the preferable supply station within the travelable area. Therefore, the user can easily find the supply station and easily enjoy the driving. Further, since information display system 1 displays the charge time needed for reaching from the supply station to the destination and the moving time needed for reaching the destination, the user can determine whether a margin time for taking a side-trip is remained or not.

Figure 6:
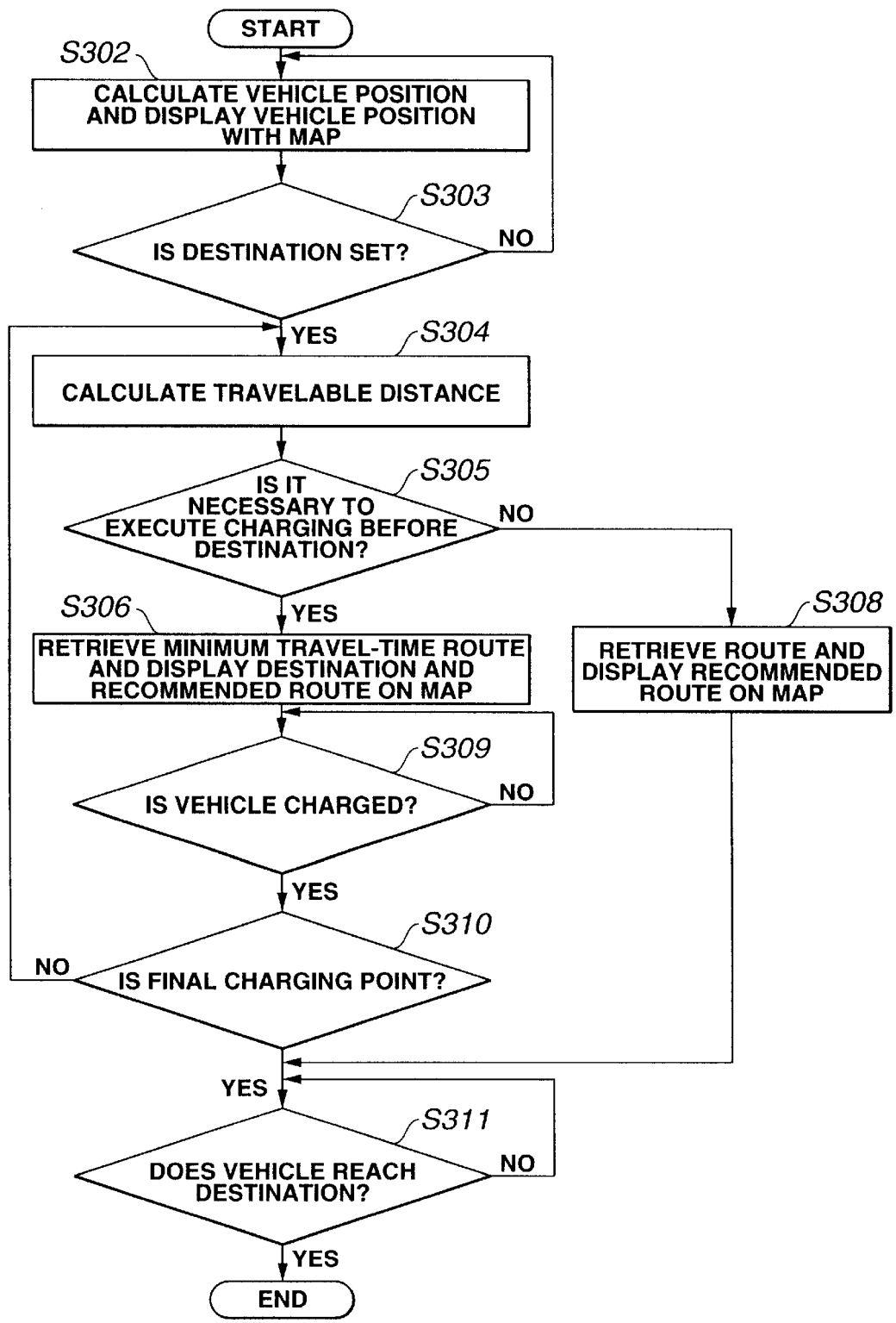
FIG. 6 is a flowchart showing an operation of the third embodiment.
Figure 7:
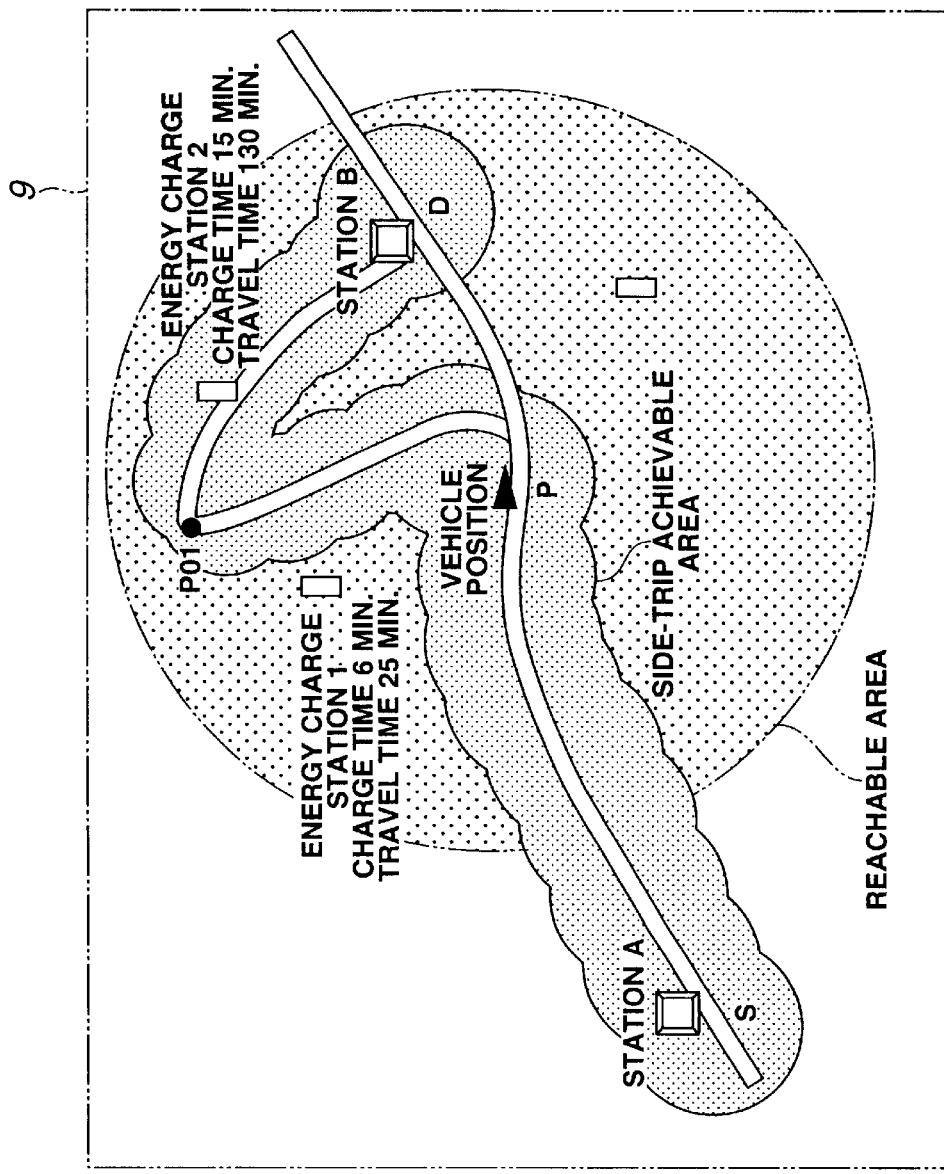
FIG. 7 is a view showing a displayed content as a result of the operation of the third embodiment.

Referring to FIGS. 6 and 7, there is shown a third embodiment of information display system according to the present invention.

FIG. 6 is a flowchart showing an operation of information display system 1 of the third embodiment. FIG. 7 is the route information displayed as a result of the operation shown by the flowchart of FIG. 6.

Since the basic construction of the third embodiment is basically similar to the construction of the first embodiment, and therefore the explanation thereof is omitted herein. The third embodiment is characteristically arranged such that information display system 1 displays the optimum route by using the totalized need time for executing the energy charge, in view of shortening the need time. (in the second embodiment, the need time of the case that the energy supply is executed by way of the supply station is displayed for the user.)

More specifically, the travel distance calculating section 4 obtains a new recommended route, which takes the shortest time for the side-trip including movement upon taking account of the travelable distance based on the residual energy quantity, the present position of the vehicle, the destination and the energy charge at the supply station. Further, on the basis of the obtained new recommended route, the guidance information stored in CD-ROM 8 is read, and editing section 5 edits the route information taking account of the energy charge, and outputs the edit information to monitor 9. Monitor 9 displays this route information, the present position and the travelable area on the map.

The operation of the third embodiment will be discussed with reference to the flowchart of FIG. 6 and the route information shown in FIG. 7.

The third embodiment is arranged such that GPS receiver functioning as positional information obtaining section 6 receives the radio waves from GPS satellites and outputs the present position indicative signal through receiving section 3 to travel distance calculating section 4. CD-ROM functioning as storage section 8 has previously stored the map data including roads, position data as to various POI (Point of Interest), position data of supply stations. On the other hand, residual quantity detecting section 7 for detecting the residual quantity of the battery outputs the information indicative of the residual quantity to travel distance calculating section 4. Travel distance calculating section 4 calculates a travelable distance according to the residual quantity of the energy in the battery.

At step S302, information display system 1 calculates the present vehicle position P and displays the present vehicle position P with the map on the monitor. More specifically, travel distance calculating section 4 calculates the start vehicle position as S on the basis of the signal of GPS receiver, and displays the position S and the map around the position S.

At step S303, information display system 1 determines whether the user has set a destination or not. When the determination at step S303 is affirmative, that is, when the user sets destination D through interface 2, the routine proceeds to step S304 wherein travel distance calculating section 4 calculates the travelable distance.

At step S305 subsequent to the execution of step S304, information display system 1 determines whether or not it is necessary to execute the energy charge before the vehicle reaches the destination. When the determination at step S305 is negative, that is, when it is not necessary to execute the energy charge before the vehicle reaches the destination, the routine proceeds to step S308 wherein the route from the present position to the destination is simply displayed through output section 9. When the determination at step S305 is affirmative, that is, when it is necessary to execute the energy charge, the routine proceeds to step S306 wherein the route of ensuring the shortest movement time is retrieved, and displays this recommended route, the position of supply station and the need time for the energy charge are displayed on the map shown in the monitor 9 as shown in FIG. 7, by the execution of step S306.

The route information shown in FIG. 7 includes the present position of the vehicle, POI (point of interest), the position of the supply station, the charging time, and the moving time corresponding to the moving distance. Further, the recommended route, which achieves the shortest need time to reach the destination, and the travelable area (side-trip achievable area) are displayed.

The operation of step S306 is specifically discussed hereinafter. Supply cost calculating section 43 and need time totalizing section 44 of travel distance calculating section 4 calculates the need time needed for reaching the destination by way of the energy charge by each route, on the basis of guidance information (including the map information) 81 and supply information (including the position information of supply stations) 83. Travel distance calculating section 4 obtains the shortest travel time route in the same manner of obtaining the recommended route from the present position to the destination. Generally, the inner resistance of the battery increases according to the increase of the charged level of the battery, the charging speed (charge quantity/time) decreases according to the increase of the charged level. That is, the time needed for charging the battery to 60% is short, and the time needed for charging the battery to 100% (full charge) is very large.

Accordingly, the total need time in case that the vehicle reaches the destination by repeatedly executing the energy charges becomes smaller than the total need time in case that the vehicle reaches the destination by once executing the energy charge to the full charge level. Therefore, two or more supply stations may be selected upon taking account of this condition. Practically, the user finally selects the actual route from the recommended routes.

At step S309, it is determined whether the energy charge has been executed or not. When the determination at step S309 is negative, that is, when the energy charge has not been executed, the routine repeats step S309. That is, the present routine awaits that the energy charge is executed.

At step S310 subsequent to the affirmative determination at step S309, it is determined whether the vehicle reaches a final charging point or not. When the determination at step S310 is negative, that is, when the vehicle does not reach the final charging point, the routine returns to step S304 in order to repeat the steps S304 through S310 until the vehicle reaches the final charging point. When the determination at step S310 is affirmative, that is, when the vehicle reaches the final charging point, the charging of the vehicle is executed, and the vehicle goes to the destination without executing the change of the display content.

At step S311, it is determined whether the vehicle reaches the destination or not. Step S311 is repeated until the vehicle reaches the destination. After the affirmative determination at step S311, the present routine of FIG. 6 is terminated.

With the thus arranged third embodiment according to the present invention, when the electric vehicle moves to the destination, information display system 1 can recommend the shortest travel-time route by which the need time for reaching the destination by way of the energy charge. Therefore, it becomes possible that the user reaches the destination by way of the energy charge through a route by which the need time to the destination becomes smallest.

Throughout the explanations of the first, second and third embodiments according to the present invention, the positional information includes information as to a present position of the user, and the destination information includes information as to a destination to which the user will reach and includes a via point in addition to the destination. The guidance information includes map information which includes route information, energy supply points, facilities and restaurants corresponding to positions on the map. The consumption information includes information as to energy consumption which mainly includes energy-ratio information (travel distance/energy quantity) of the vehicle. This energy-ratio information may be defined upon corresponding to a vehicle speed, experimentally traveled routes and kinds of roads. The route information finally displayed to the user relates to a route within the travelable area corresponding to the travelable distance information obtained from the residual energy quantity of the vehicle. This information is available for the user to predict the movable area. More specifically, such information is available for the user to execute determinations as to how long distance the vehicle can travel only by a residual energy, as to where the vehicle can reach, as to whether the vehicle can reach the destination, as to whether the vehicle can pass a desired via point, as to whether it is possible to execute energy charge in case that the vehicle can not reach the destination or the via point, as to where energy supply stations are located, and as to where is the most preferable place of executing the energy charge upon taking account of the destination and the via point.

Accordingly, the route information is edited and displayed so as to help the determinations of the user. Usually, the user recognizes the residual quantity of the energy as a quantity and executes the energy charge when the residual quantity approaches zero. However, the final object of the user is not to avoid the running out of the energy, but is to drive the vehicle according to the user's object. It is certain to satisfy this object in case that there is no anxiousness as to the energy supply. However, in case that the vehicle travels a mountain corridor where there is few energy supply stations, or in case that the user utilizes an electric vehicle whose energy supply station is absolutely lacking, the user will be required to execute the determination from the presumption of the limitation of the residual energy quantity. In such a case, the route information displayed by information display system 1 according to the present invention is available for the user to predict the possibility of the aimed action.

In order to provide the available route information through information display system 1, the travelable area is set by the following first and second views. The first view is that the travelable area is defined as a spread relative to a line connecting the present position and the destination, and is set along the route to the destination so as to display the travelable area around the route. Accordingly, in a case that the user basically drives the vehicle along the route between the present position and the destination, even if the vehicle deviates from the route, the user can recognize whether the present position of the vehicle is within the travelable area from information display system 1 according to the present invention. This enables the user to easily enjoy a side-trip during the travel to the destination. The second view is that the travelable area is defined as a spread relative to the present position of the vehicle, and is set round the present position, so as to display the route information which shows how far the vehicle can travel from the present position.

On the presumption that the vehicle starts from the present position, the user can recognize a side-tip achievable area deviated from the present position, and can safely enjoy the side-trip. Since the first and second views are not opposed with each other, it is possible to simultaneously display both of the first and second views. Under this both view displayed condition, the user can simultaneously recognize both of the side-trip achievable area along the route and the side-trip achievable area from the present position. This arrangement displays an available information to the user so as to enable the user to execute a further expanded determination.

The present position information and the destination information may be inputted by the user through interface 2 or may be automatically inputted from a GPS installed in the vehicle, a self-positioning device or other positioning device. Storage section 8 may be installed in the vehicle or in a server accessible to information display system 1 in the vehicle through communication line. Kinds of energy detected by residual quantity detection section 7 is not limited to electric energy, and may be gasoline, alcohol and hydrogen. Although travel distance calculating section 4 calculates the travelable distance with reference to the residual energy quantity and the consumption information indicative of energy ratio (travel distance/energy quantity), the travelable distance may be obtained by multiply the energy ratio (travel distance/energy quantity) and the residual energy quantity, or may be calculated upon taking account of the traveling route, the condition in the traveling route such as road information, traffic information, kinds of road, weather, temperature, and using states of accessories. The travelable area may be set as a circular area simply defined by the travelable distance or as an area obtained by concretely calculating the distances of corresponding routes. The route information may be a combination between the map information including the recommended route and the travelable area.

Although the first, second and third embodiments have been shown and described so as to employ various components of the navigation system installed in the vehicle as elements of information display system 1, it is of course that information display system 1 may be constructed independently without employing components of the navigation system.

This application is based on Japanese Patent Application No. 2001-207923 filed on Jul. 9, 2001 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An information system for a vehicle, comprising:
   an information receiving section that receives positional information including a position of the vehicle and destination information including a destination of the vehicle;
   a storage section that stores guidance information including map information and consumption information as to an energy consumption of the vehicle;
   a residual quantity detecting section that detects a residual energy quantity of the vehicle;
   a travel distance calculating section that calculates a travelable distance according to the residual energy quantity and with reference to the guidance information;
   an editing section that sets a travelable area wherein the vehicle can make a side-trip without charging energy, according to the positional information, the travelable distance and the guidance information, the editing section editing route information obtained by combining the travelable area and the map information including a recommended route; and
   an outputting section that displays the route information.

2. The information system as claimed in claim 1, wherein the travel distance calculating section comprises an energy supply information generating section that generates charge necessity information indicative whether it is necessary to execute an energy charging of the vehicle, on the basis of the travelable distance and a distance of the recommended route between the present position and the destination.

3. The information system as claimed in claim 2, wherein the guidance information includes supply information indicative of energy supply points, the travel distance calculating section including a supply point selecting section which selects at least one of energy supply points within the travelable area, and the editing section editing the route information including the charge necessity information.

4. The information system as claimed in claim 3, wherein the travel distance calculating section includes a charging cost calculating section which calculates an energy charging cost of an energy quantity charged at the energy charge point on the basis of the positional information, the destination information and the charging information, and the editing section editing the route information including a total need time needed for traveling the route between the present position and the destination.

5. The information system as claimed in claim 4, wherein the travelable distance calculating section includes a need time totalizing section which obtains a total time period needed for reaching the destination through the selected energy supply point on the basis of the energy charging cost at each of the energy supply points, the present position and the destination, and the editing section editing the routine information including the total time period.

6. The information system as claimed in claim 1, wherein the residual quantity of the energy includes one of a residual quantity of a battery for one of an electric vehicle and a hybrid vehicle and a residual quantity of fuel for one of an internal-combustion-engine drive vehicle and a hybrid vehicle.

7. An information system for an electric vehicle, comprising:
   an information receiving section that receives present position information including a present position of the electric vehicle and destination information including a destination of the vehicle;
   a storage section that stores guidance information including map information and energy supply information as to energy supply stations, and consumption information as to an energy consumption of the electric vehicle;
   a battery detecting section that detects a charged state of a battery of the electric vehicle;
   a travel distance calculating section that calculates a travelable distance corresponding to the charged state of the battery with reference to the consumption information;
   an editing section that sets a travelable area of the electric vehicle on the basis of the travel distance information and wit reference to the guidance information, the editing section editing route information including a recommended route within the travelable area; and
   an outputting section that displays the route information;
   wherein the travel distance calculating section comprises an energy supply point selecting section that determines as to whether it is necessary to execute an energy charge on the basis of the travelable distance, to present position information and the destination information, the energy supply point selecting section selecting at least one of the energy supply stations within the travelable area with reference to the energy supply information when it is necessary to execute the energy charge,
   wherein the travel distance calculating section comprises a charge cost calculating section that calculates a charge cost corresponding to a charge quantity needed at each supply point,
   wherein the editing section edits the route information which includes at least one of positions of selected energy supply points, a charge quantity charged at each of the energy supply points and a need time needed for charging each of the charge quantity.

8. The information system as claimed in claim 7, wherein the travel distance calculating section includes a need time totalizing section which totalizes a time period taken for reaching the destination through each of the selected supply points, and the editing section edits the route information including at least the totalized need time.

9. An information system for a vehicle, comprising:
information receiving means for receiving positional information including a position of the vehicle and destination information including a destination of the vehicle;
storage means for storing guidance information including map information and consumption information as to an energy consumption of the vehicle;
residual quantity detecting means for detecting a residual energy quantity of the vehicle;
travel distance calculating means for calculating a travelable distance according to the residual energy quantity and with reference to the guidance information;
editing means for setting a travelable area wherein the vehicle can make a side-trip without charging energy, according to the positional information, the travelable distance and the guidance information, the editing section editing route information obtained by combining the travelable area and the map information including a recommended route; and
outputting means for displaying the route information.

10. A method for displaying information to a user of a vehicle, comprising:
receiving positional information including a position of the vehicle and destination information including a destination of the vehicle;
storing guidance information including map information and consumption information as to an energy consumption of the vehicle;
detecting a residual energy quantity of the vehicle;
calculating a travelable distance according to the residual energy quantity and with reference to the guidance information;
setting a travelable area wherein the vehicle can make a side-trip without charging energy, according to the positional information, the travelable distance and the guidance information,
editing route information obtained by combining the travelable area and the map information including a recommended route; and
displaying the route information.

11. An information system for an electric vehicle, comprising:

an information receiving section that receives present position information including a present position of the electric vehicle and destination information including a destination of the vehicle;
a storage section that stores guidance information including a map information and energy supply information as to energy supply stations, and consumption information as to an energy consumption of the electric vehicle;
a battery detecting section that detects a charged state of a battery of the electric vehicle;
a travel distance calculating section that calculates a travelable distance corresponding to the charged state of the battery with reference to the consumption information;
an editing section that sets a travelable area wherein the electric vehicle can make a side-trip without charging energy, on the basis of the travel distance information and with reference to the guidance information, the editing section editing route information by combining the travelable area and map information including a route; and
an outputting section that displays the route information;
wherein the travel distance calculating section comprises an energy supply point selecting section that determines as to whether it is necessary to execute an energy charge on the basis of the travelable distance, the present position information and the destination information, the energy supply point selecting section selecting at least one of the energy supply stations within the travelable area with reference to the energy supply information when it is necessary to execute the energy charge,
wherein the travel distance calculating section comprises a charge of cost calculating section that calculates a charge cost corresponding to a charge quantity needed at each supply point,
wherein the editing section edits the route information which includes at least one of positions of selected energy supply points, a charge quantity charged at each of the energy supply points and a need time needed for charging each of the charge quantity.

* * * * *